(12) United States Patent
Chen et al.

(10) Patent No.: US 11,889,192 B2
(45) Date of Patent: Jan. 30, 2024

(54) LOAD STABILIZATION DEVICE, CONTROL METHOD THEREOF, AND COMPUTER READABLE STORAGE MEDIUM

(71) Applicant: SZ DJI TECHNOLOGY CO., LTD., Shenzhen (CN)

(72) Inventors: Zihan Chen, Shenzhen (CN); Wen Xu, Shenzhen (CN); Peng Bin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 150 days.

(21) Appl. No.: 17/584,274

(22) Filed: Jan. 25, 2022

(65) Prior Publication Data

US 2022/0150393 A1 May 12, 2022

Related U.S. Application Data

(63) Continuation of application No. PCT/CN2019/098336, filed on Jul. 30, 2019.

(51) Int. Cl.
*H04N 23/68* (2023.01)

(52) U.S. Cl.
CPC ....... *H04N 23/685* (2023.01); *H04N 23/6812* (2023.01)

(58) Field of Classification Search
CPC .. H04N 23/685; H04N 23/6812; H04N 23/57; H04N 23/68; H04N 23/681;
(Continued)

(56) References Cited

U.S. PATENT DOCUMENTS

| 5,054,725 A * | 10/1991 | Bucefari ............... F16M 11/18 352/243 |
| 2005/0052531 A1* | 3/2005 | Kozlov ............... H04N 23/687 348/E5.046 |

(Continued)

FOREIGN PATENT DOCUMENTS

| CN | 107241912 A | 10/2017 |
| CN | 107278246 A | 10/2017 |

(Continued)

OTHER PUBLICATIONS

International Search Report of PCT/CN2019/098336 (dated Apr. 29, 2020).

*Primary Examiner* — Albert H Cutler (57) ABSTRACT

The present disclosure provides a load stabilization device, a control method thereof, and a computer readable storage medium. In the load stabilization device, a motion sensor, a processor, a stabilization motor, and a parallelogram mechanism constitute a closed-loop feedback control system. A control instruction for the stabilization motor is generated based on a velocity of a second end of the parallelogram mechanism in a direction of gravity relative to a ground, where the second end may carry a load, and the stabilization motor is controlled to drive, according to the control instruction, the parallelogram mechanism to rotate relative to a base, so as to at least partially offset or compensate for jitter of the load carried at the second end of the parallelogram mechanism in the direction of gravity, suppress disturbance generated at a first end of the parallelogram mechanism, and stabilize the load carried at the second end.

20 Claims, 4 Drawing Sheets

(58) Field of Classification Search
CPC ....... F16M 2200/044; F16M 2200/063; F16M 11/123; G05D 3/12; B64U 2101/30; B64U 2101/00; G01C 9/005
USPC .......................................................... 348/117
See application file for complete search history.

(56) References Cited

U.S. PATENT DOCUMENTS

2005/0231634 A1* 10/2005 Chapman ............. G03B 17/561
 348/373
2011/0080564 A1* 4/2011 Taylor ................... B66F 11/048
 352/243

FOREIGN PATENT DOCUMENTS

| CN | 107483781 A | 12/2017 |
| CN | 109542125 A | 3/2019 |
| CN | 109981974 A | 7/2019 |
| WO | 2018170882 A1 | 9/2018 |

* cited by examiner

LOAD STABILIZATION DEVICE, CONTROL METHOD THEREOF, AND COMPUTER READABLE STORAGE MEDIUM

RELATED APPLICATIONS

This application is a continuation application of PCT application No. PCT/CN2019/098336, filed on Jul. 30, 2019, and the content of which is incorporated herein by reference in its entirety.

TECHNICAL FIELD

Embodiments of the present disclosure relate to the control field, and in particular, to a load stabilization device, a control method thereof, and a computer readable storage medium.

BACKGROUND

For the purpose of stabilizing a load (such as a photographing device), many loads are equipped with a gimbal. The gimbal can implement stabilization in a rotation direction of the load. For example, a three-axis gimbal can actively compensate for load jitter in rotation directions of a pitch axis, a yaw axis, and a roll axis by using a drive device (such as a stabilization motor), to stabilize the load.

However, the load jitter may be caused by gravity. Currently, a stabilization device cannot implement an ideal stabilization function for the load.

BRIEF SUMMARY

Embodiments of the present disclosure provide a load stabilization device, a control method thereof, and a computer readable storage medium, to stabilize a load in a direction of gravity.

A first aspect of the embodiments of the present disclosure provides a load stabilization device, including: a base; a parallelogram mechanism including: a first end through which the parallelogram is rotatably connected to the base, and a second end away from the first end to carry a load; a motion sensor; a stabilization motor, configured to drive the parallelogram mechanism to rotate relative to the base; and at least one processor, configured to: obtain sensor data output by the motion sensor, determine a velocity of the second end in a direction of gravity relative to a ground based on the sensor data, and generate a control instruction, based on the velocity of the second end in the direction of gravity relative to the ground, to direct the stabilization motor to drive the parallelogram mechanism to rotate relative to the base to stabilize the load carried at the second end.

A second aspect of the embodiments of the present disclosure provides a method for controlling a load stabilization device, where the load stabilization device includes at least one processor, a base, a parallelogram mechanism including a first end through which the parallelogram is rotatably connected to the base, and a second end away from the first end to carry a load, a motion sensor, and a stabilization motor, configured to drive the parallelogram mechanism to rotate relative to the base, the method includes: obtaining, by the at least one processor, sensor data output by the motion sensor; determining, by the at least one processor, a velocity of the second end in a direction of gravity relative to a ground based on the sensor data; and generating, by the at least one processor and based on the velocity of the second end in the direction of gravity relative to the ground, a control instruction for the stabilization motor drive the parallelogram mechanism to rotate relative to the base to stabilize the load carried at the second end.

BRIEF DESCRIPTION OF THE DRAWINGS

In order to describe the technical solutions in the embodiments of the present disclosure, the accompanying drawings required to describe the embodiments are briefly described below. Apparently, the accompanying drawings described below are only some exemplary embodiments of the present disclosure. Those of ordinary skill in the art may further obtain other drawings based on these accompanying drawings without inventive efforts.

REFERENCE NUMERALS

10: Load stabilization device; 30: Photographing device;
11: Base; 12: Parallelogram mechanism; 13: Motion sensor;
14: Processor; 15: Stabilization motor; 111: Support member;
112: Fixed portion; 121: Load connection portion; 120: Four-bar linkage;
1201: First cross rod portion; 1202: Second cross rod portion; 1203: Vertical rod portion;
131: Inertial measurement unit; 132: Visual odometer+ Magnetic encoder;
141: Digital controller; 142: Kalman filter; 151: First stabilization motor;
152: Second stabilization motor; 153: First transmission component; 154: Second transmission component;
50: Elastic member.

DETAILED DESCRIPTION

The following describes the technical solutions in some exemplary embodiments of the present disclosure with reference to the accompanying drawings. Apparently, the described embodiments are merely some but not all of the embodiments of the present disclosure. All other embodiments obtained by those of ordinary skill in the art based on these exemplary embodiments of the present disclosure without creative efforts shall fall within the scope of protection of the present disclosure.

It should be noted that when a component is referred to being "fixed to" another component, it may be directly on that component or an intermediate component may also exist. When a component is considered to be "connected to" another component, it may be directly connected to that component, or an intermediate component may also exist.

Unless otherwise defined, all technical and scientific terms used herein have the same meaning as commonly understood by those skilled in the technical field of the present disclosure. The terms used in the present disclosure are only for the purpose of describing specific exemplary embodiments, and are not intended to limit the present disclosure. The term "and/or" used herein includes any and all combinations of one or more listed items.

The following describes in detail some exemplary embodiments of the present disclosure with reference to the accompanying drawings. If no conflict occurs, the following exemplary embodiments and features in these embodiments may be combined to each other.

Figure 1:
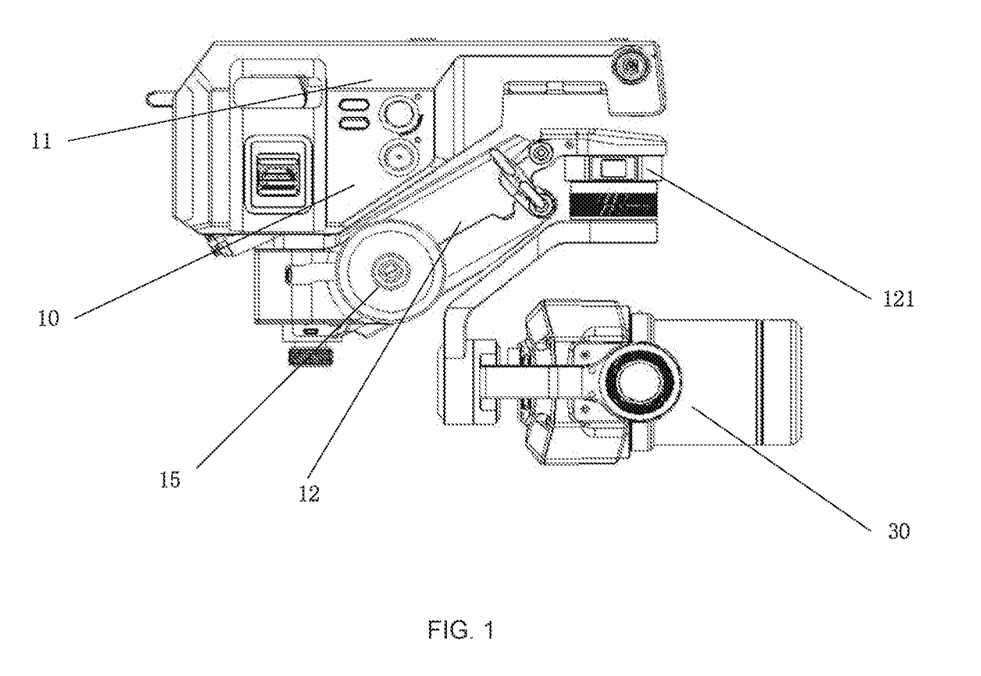
FIG. 1 is a schematic diagram of a mechanical structure of a load stabilization system according to some exemplary embodiments of the present disclosure.
Figure 2:
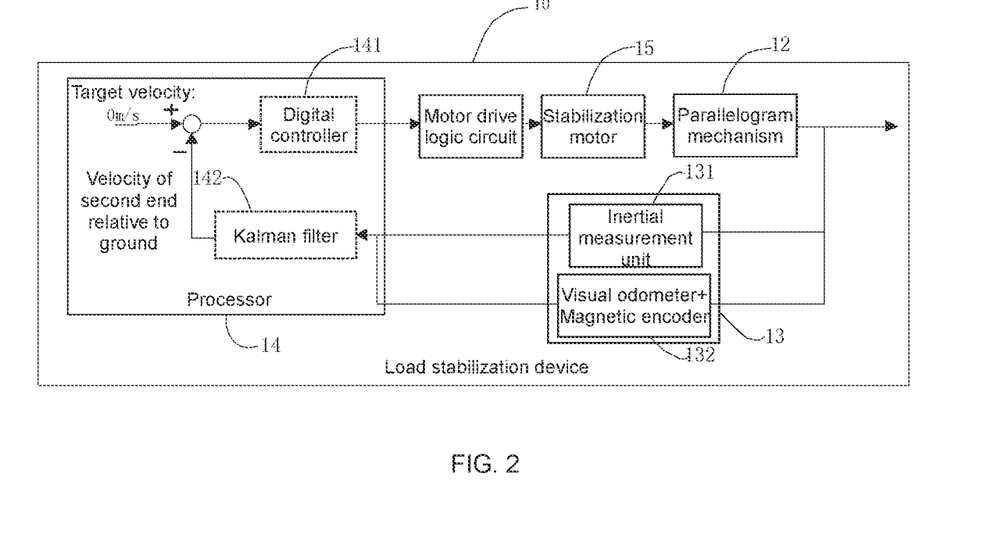
FIG. 2 is a schematic diagram of a system structure of a load stabilization device according to some exemplary embodiments of the present disclosure.

Some exemplary embodiments of the present disclosure provide a load stabilization device. FIG. 1 is a schematic diagram of a mechanical structure of a load stabilization system according to some exemplary embodiments of the present disclosure. FIG. 2 is a diagram of a system structure of a load stabilization device according to some exemplary embodiments of the present disclosure. The load stabilization system may include a load stabilization device 10 and a load 30. The load 30 may include a photographing device. The photographing device may be an optical camera, a thermal infrared camera, another type of device having a photographing function, or the like.

The load stabilization device 10 includes a base 11, a parallelogram mechanism 12, a motion sensor 13, a processor 14, and a stabilization motor 15. The parallelogram mechanism 12 includes a first end and a second end away from the first end. The parallelogram mechanism 12 is rotatably connected to the base 11 via the first end. The second end of the parallelogram mechanism 12 is used to carry the load.

In the load stabilization system, the load 30 is removably mounted to the second end of the parallelogram mechanism 12. For schematic illustration, the load 30 shown in FIG. 1 may be configured to capture an image/a video.

The motion sensor 13 may be electrically connected to the processor 14. The motion sensor 13 may be configured to output sensor data including motion status information of the parallelogram mechanism 12 to the processor 14 for determining a velocity of the second end.

The processor 14 may be electrically connected to the stabilization motor 15. The processor 14 may be configured to: obtain sensor data output by the motion sensor 13, and determine a velocity of the second end of the parallelogram mechanism 12 in a direction of gravity relative to a ground according to the sensor data; and generate a control instruction for the stabilization motor 15 based on the velocity of the second end of the parallelogram mechanism 12 in the direction of gravity relative to the ground. In some exemplary embodiments, the processor may be specifically a microcontroller. In addition, there may be one or more processors.

Further, the processor 14 may generate the control instruction for the stabilization motor based on the velocity of the second end of the parallelogram mechanism 12 in the direction of gravity relative to the ground and a target velocity of the second end of the parallelogram mechanism 12 in the direction of gravity relative to the ground, where the target velocity of the second end of the parallelogram mechanism 12 in the direction of gravity relative to the ground may be 0. The stabilization motor 15 is configured to drive, according to the control instruction, the parallelogram mechanism 12 to rotate relative to the base 11, so as to stabilize the load carried at the second end of the parallelogram mechanism 12, such that the velocity of the second end in the direction of gravity relative to the ground approximates 0.

As shown in FIG. 2, the processor 14 may include a digital controller 141. The processor 14 may be configured to calculate, according to the sensor data obtained from the motion sensor 13, the velocity of the second end of the parallelogram mechanism 12 in the direction of gravity relative to the ground, and calculate an error value between the velocity of the second end of the parallelogram mechanism 12 in the direction of gravity relative to the ground and an expected velocity, and input the error value to the digital controller 141. The digital controller 141 generates the control instruction for the stabilization motor 15 based on the error value.

In some exemplary embodiments, the motion sensor 13 may include a plurality of sensor combinations, and each sensor combination may include at least one motion sensor. Any one of the sensor combinations may detect a set of sensor data. The processor 14 may obtain a velocity of the second end of the parallelogram mechanism 12 in the direction of gravity relative to the ground through calculation based on each set of sensor data. In this way, at least two velocities of the second end of the parallelogram mechanism 12 in the direction of gravity relative to the ground can be obtained. As shown in FIG. 2, the processor 14 may further include a Kalman filter 142. The processor 14 may fuse (e.g., combine or add) the at least two velocities of the second end of the parallelogram mechanism 12 in the direction of gravity relative to the ground by using the Kalman filter 142 so as to obtain a fused (e.g., combined or added)velocity, that is, a velocity of the second end in the direction of gravity relative to the ground after the fusion, and generates the control instruction for the stabilization motor 15 based on the fused (e.g., combine or add) velocity.

Figure 3:
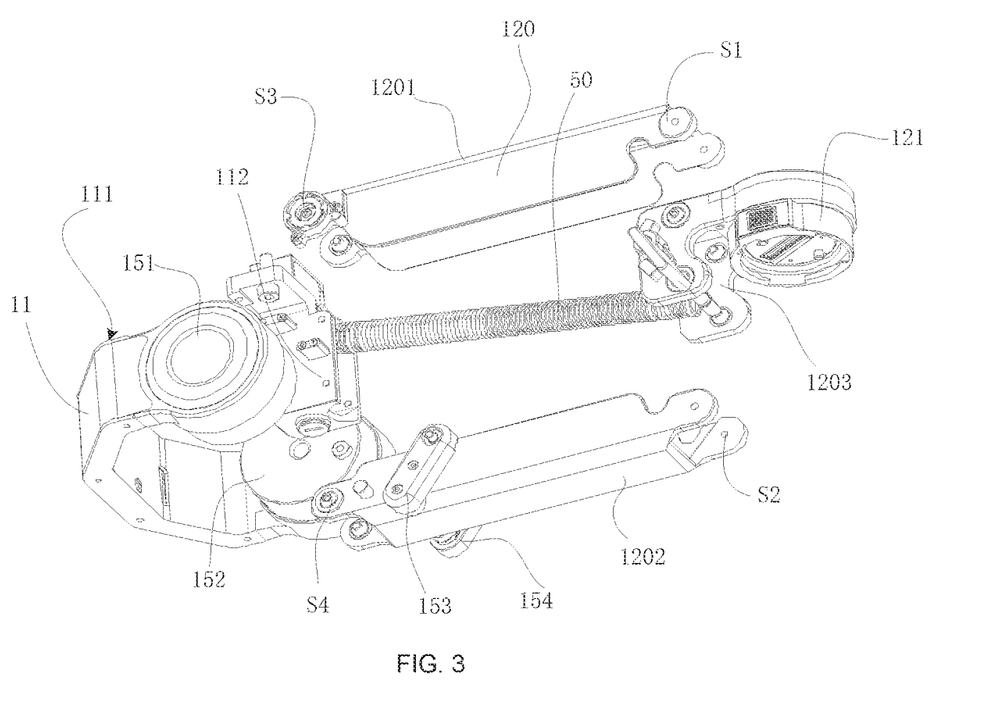
FIG. 3 is a schematic structural diagram of some components of a load stabilization device according to some exemplary embodiments of the present disclosure.

Exemplarily, referring to FIG. 3, the stabilization motor 15 may include a first stabilization motor 151 and a second stabilization motor 152. The first stabilization motor 151 and the second stabilization motor 152 may be configured to jointly drive, according to the control instruction, the parallelogram mechanism 12 to rotate relative to the base 11. In some exemplary embodiments, the load stabilization device 10 may include a motor drive logic circuit. The motor drive logic circuit may be configured to receive the control instruction from the processor to drive the stabilization motor to rotate. In this way, the stabilization motor drives, according to the control instruction, the parallelogram mechanism to rotate relative to the base to stabilize the load carried at the second end.

In some exemplary embodiments, as shown in FIG. 3, the load stabilization device may further include a first transmission component 153 and a second transmission component 154. The first transmission component 153 is rotatably connected to the first stabilization motor 151 and the parallelogram mechanism 12. The second transmission component 154 is rotatably connected to the second stabilization motor 152 and the parallelogram mechanism 12. The first stabilization motor 151 and the second stabilization motor 152 jointly drive, through the first transmission component 153 and the second transmission component 154, the parallelogram mechanism 12 to rotate relative to the base 11.

Specifically, one end of the first transmission component 153 and one end of the second transmission component 154 may be rotatably connected to a rotor of the first stabilization motor 151 and a rotor of the second stabilization motor 152, respectively. Another end of the first transmission component 153 and another end of the second transmission component 154 may be rotatably connected to the parallelogram mechanism 12. When the first stabilization motor 151 and the second stabilization motor 152 rotate, the first stabilization motor 151 and the second stabilization motor 152 may respectively drive the first transmission component 153 and the second transmission component 154 to move, so that the first transmission component 153 and the second transmission component 154 may drive an angle between the parallelogram mechanism 12 and the base 11 to change, thereby driving the parallelogram mechanism 12 to rotate relative to the base 11.

In some exemplary embodiments, as shown in FIG. 3, the parallelogram mechanism 12 may include a four-bar linkage 120 and a load connection portion 121. One end of the four-bar linkage 120 may be connected to the load connection portion 121, and another end is rotatably connected to the base 11. The load connection portion 121 may be provided with a quick release interface for carrying a load device, in order to implement mechanical coupling. In some exemplary embodiments, the quick release interface may further serve as an electrical interface, and the electrical interface may be configured to transmit a power signal and/or a data signal. Driven by the second stabilization motor 152, the four-bar linkage 120 may rotate around a support member 111. Driven by the rotating four-bar linkage 120, the load connection portion 121 and the load carried thereon may move in the direction of gravity. An amount of jitter of the load in the direction of gravity can be at least partially offset by controlling a rotation direction and a rotation angle of each of the first stabilization motor 152 and the second stabilization motor 152 to stabilize the load.

Still referring to FIG. 3, the four-bar linkage 120 may include a first cross rod portion 1201, a second cross rod portion 1202 opposite to the first cross rod portion 1201, and a vertical rod portion 1203 connected between the first cross rod portion 1201 and the second cross rod portion 1202. The vertical rod portion 1203 may be connected to the load connection portion 121. The second end of the parallelogram mechanism 12 may include at least the load connection portion 121. The second end may further include the vertical rod portion 1203. One end of the first cross rod portion 1201 and one end of the second cross rod portion 1202 may be connected to the vertical rod portion 1203. The other end of the first cross rod portion 1201 and the other end of the second cross rod portion 1202 may be connected to a fixed portion 112 of the base 11. The fixed portion 112 may be a part of the base 11 and fixedly connected to the support member 111 of the base 11. The support member 111 may be used for mounting the first stabilization motor 151 and the second stabilization motor 152. The fixed portion 112 may be disposed opposite to the vertical rod portion 1203. During motion of the Four-bar linkage 120, the first cross rod portion 1201, the second cross rod portion 1202, and the vertical rod portion 1203 may move around the fixed portion 112. The first cross rod portion 1201, the second cross rod portion 1202, and the vertical rod portion 1203 may be considered as rods of the four-bar linkage 120.

The two ends of the first cross rod portion 1201 may be hingedly connected to the vertical rod portion 1203 and the fixed portion 112, respectively, with hinge points being S1 and S3, respectively. The two ends of the second cross rod portion 1202 may be hingedly connected to the vertical rod portion 1203 and the fixed portion 112, respectively, with hinge points being S2 and S4, respectively. A line connecting the hinge points S1 and S3 is S1S3, a line connecting the hinge points S2 and S4 is S2S4, and S1S3 is parallel and equal to S2S4. The foregoing arrangement enables an angle between adjacent rods (for example, an angle between the first cross rod portion 1201 and the vertical rod portion 1203, or an angle between the second cross rod portion 1202 and the vertical rod portion 1203) to change. Opposing sides always remain parallel regardless of the change of the angle. In this way, an attitude of the vertical rod portion 1203 may remain unchanged when an attitude of the fixed portion 112 remains unchanged. In this way, the second end of the parallelogram mechanism may drive the load to move in translation. More precisely, lines S1S3, S2S4, S1S2, and S3S4 of adjacent hinge points are considered as four sides of the four-bar linkage.

The stabilization motor may drive the first cross rod portion 1201 or the second cross rod portion 1202 directly or by using the transmission component, so that the first cross rod portion 1201 and the second cross rod portion 1202 may rotate clockwise or counterclockwise relative to the fixed portion to drive the vertical rod portion 1203 to ascend or descend. When the vertical rod portion 1203 moves, the load connection portion 121 moves simultaneously with the vertical rod portion 1203. In some exemplary embodiments as shown in FIG. 3, the first stabilization motor 151 and the second stabilization motor 152 may be fixed to the base 11, and provide power for rotation for the first cross rod portion 1201 and the second cross rod portion 1202 by using the first transmission component 153 and the second transmission component 154.

In some exemplary embodiments, the load stabilization device 10 may further include an elastic member 50. The elastic member 50 may be mounted in an accommodation space formed by the parallelogram mechanism 12. Specifically, one action end of the elastic member 50 may be mounted to the fixed portion 112, and the other action end thereof may be mounted to the vertical rod portion 1203. A component of an elastic force (balance force) generated by the elastic member 50 in the direction of gravity may be used to balance the gravity of the load device and the weight of the load stabilization device 10. In other words, the load stabilization device 10 may balance the gravity of the load and/or the parallelogram mechanism by the elastic force of the elastic member 50.

In some exemplary embodiments, the base 11 may further include a support member. The support member may be a handheld support device that can be held by a user. In some exemplary embodiments, the support member may be a connection device for connecting the load stabilization device to a movable platform (an aerial vehicle, a ground robot, or the like).

Figure 4:
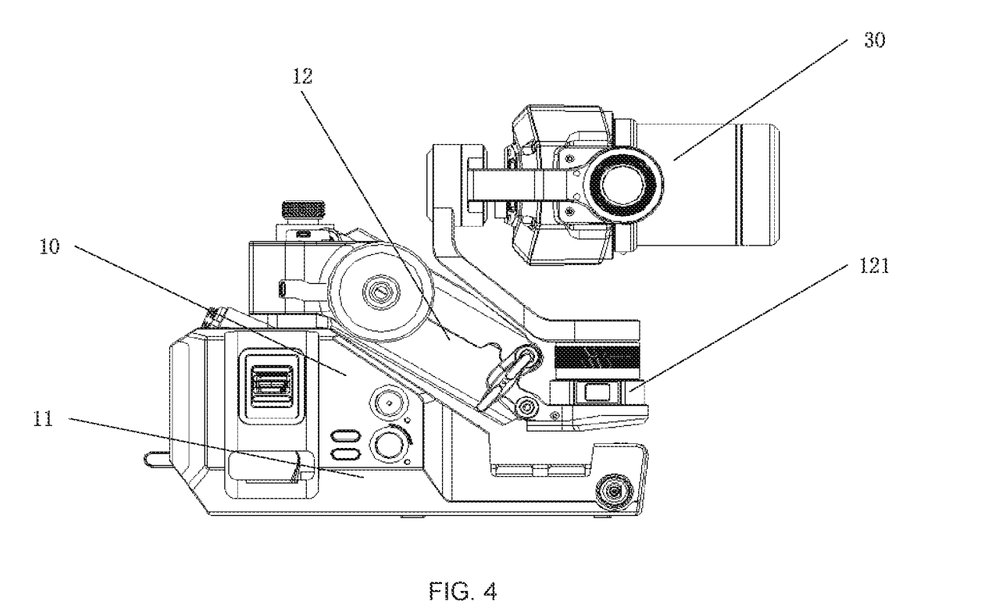
FIG. 4 is a schematic diagram of a working state of a load stabilization system according to some exemplary embodiments of the present disclosure.

It may be understood that, the load stabilization system or the load stabilization device may have two working states, for example, a upright state and an inverted state. It is assumed that the load stabilization system shown in FIG. 1 is a load stabilization system in the upright state. Correspondingly, the load stabilization device shown in FIG. 1 is a load stabilization device in the upright state. The load stabilization system shown in FIG. 4 is a load stabilization system in the inverted state, and correspondingly, the load stabilization device shown in FIG. 4 is a load stabilization device in the inverted state. In some exemplary embodiments, the load stabilization system shown in FIG. 1 may be used as a load stabilization system in the inverted state, and correspondingly, the load stabilization device shown in FIG. 1 is a load stabilization device in the inverted state. The load stabilization system shown in FIG. 4 is used as a load stabilization system in the upright state, and correspondingly, the load stabilization device shown in FIG. 4 is a load stabilization device in the upright state.

In some exemplary embodiments, the load stabilization device 10 may further include a three-axis gimbal. The second end of the parallelogram mechanism 12 may carry the load through the three-axis gimbal. The processor 14 may be configured to control the three-axis gimbal to stabilize the load in one or more of a yaw direction, a roll direction, and a pitch direction.

In the load stabilization device provided in some exemplary embodiments, the motion sensor 13, the processor 14, the stabilization motor 15, and the parallelogram mechanism 12 constitute a closed-loop feedback control system. The stabilization motor 15 may be controlled according to the velocity of the second end of the parallelogram mechanism 12 in the direction of gravity relative to the ground to drive the parallelogram mechanism 12 to move relative to the base 11, so as to at least partially offset or compensate for the vertical jitter of the load 30 carried at the second end of the parallelogram mechanism 12.

In some exemplary embodiments of the present disclosure, a load stabilization device is provided. As described above, the motion sensor 13 may include a first motion sensor disposed at the second end of the parallelogram mechanism 12. The processor 14 may obtain first sensor data output by the first motion sensor, and determine a velocity of the second end of the parallelogram mechanism 12 in the direction of gravity relative to the ground based on the first sensor data.

In some exemplary embodiments, the first motion sensor may include one or more of an inertial measurement unit, a vision sensor, an ultrasonic sensor, and a barometer.

In some exemplary embodiments, the first motion sensor may include the inertial measurement unit. The processor 14 may obtain first sensor data output by the inertial measurement unit, and determine the velocity of the second end of the parallelogram mechanism 12 in the direction of gravity relative to the ground according to the first sensor data output by the inertial measurement unit.

Specifically, the motion sensor 13 may include the inertial measurement unit 131. The inertial measurement unit 131 may be disposed at the second end of the parallelogram mechanism 12, for example, may be disposed on the load connection portion 121. Alternatively, the inertial measurement unit may be disposed directly on the load device. The inertial measurement unit may be configured to measure a motion state of the second end of the parallelogram mechanism 12 to output sensor data, and send the sensor data to the processor 14.

Because the inertial measurement unit is disposed at the second end of the parallelogram mechanism 12, the inertial measurement unit may sense linear acceleration of the second end of the parallelogram mechanism 12 relative to an inertial space and an angular velocity of the second end of the parallelogram mechanism 12 relative to the inertial space.

The linear acceleration of the second end of the parallelogram mechanism 12 relative to the inertial space based on a body coordinate system may be expressed as $$a_b = \begin{bmatrix} a_{bx} \\ a_{by} \\ a_{bz} \end{bmatrix},$$

where $a_{bx}$ is a component of the linear acceleration of the second end of the parallelogram mechanism 12 in the body coordinate system on an X-axis; $a_{by}$ is a component of the linear acceleration of the second end of the parallelogram mechanism 12 in the body coordinate system on a Y-axis; and $a_{bz}$ is a component of the linear acceleration of the second end of the parallelogram mechanism 12 in the body coordinate system on a Z-axis.

The angular velocity of the second end of the parallelogram mechanism 12 relative to the inertial space in the body coordinate system may be expressed as $$\omega_b = \begin{bmatrix} \omega_{bx} \\ \omega_{by} \\ \omega_{bz} \end{bmatrix},$$

where $\omega_{bx}$ is a component of the angular velocity of the second end of the parallelogram mechanism 12 in the body coordinate system on the X-axis; $\omega_{by}$ is a component of the angular velocity of the second end of the parallelogram mechanism 12 in the body coordinate system on the Y-axis; and $\omega_{bz}$ is a component of the angular velocity of the second end of the parallelogram mechanism 12 in the body coordinate system on the Z-axis.

Further, as shown in FIG. 2, the processor 14 may further include a Kalman filter 142. The processor 14 may be configured to calculate the velocity of the second end of the parallelogram mechanism 12 in the direction of gravity relative to the ground according to the linear acceleration and the angular velocity of the second end of the parallelogram mechanism 12. This can be specifically implemented in the following manner:

The processor 14 may perform data fusion on the linear acceleration $a_b$ and the angular velocity $\omega_b$ by using the Kalman filter 142 to obtain a rotation matrix of the body coordinate system relative to a geodetic coordinate system. In some exemplary embodiments, the rotation matrix is denoted as $R_b^g$.

Based on the rotation matrix, the processor 14 may obtain an expression of the linear acceleration of the second end of the parallelogram mechanism 12 relative to the inertial space based on the inertial coordinate system:

$$a_g = R_b^g a_b = \begin{bmatrix} a_{gx} \\ a_{gy} \\ a_{gz} \end{bmatrix},$$

where $a_{gz}$ is the acceleration of the second end of the parallelogram mechanism 12 relative to the inertial coordinate system in the direction of gravity.

A difference between $a_{gz}$ and a gravitational acceleration component g is integrated to obtain the velocity of the second end of the parallelogram mechanism 12 relative to the inertial coordinate system in the direction of gravity relative to the ground (denoted as $v_{gz1}$): $V_{gz1} = \int (a_{gz} - g)$.

In some exemplary embodiments, the first motion sensor may include a vision sensor or an ultrasonic sensor. The vision sensor or the ultrasonic sensor may be configured to measure a height of the second end of the parallelogram mechanism 12 relative to the ground. The first motion sensor sends first sensor data to the processor 14. The processor 14 determines the height of the second end of the parallelogram mechanism 12 relative to the ground based on the first sensor data, and calculates the velocity of the second end of the parallelogram mechanism 12 in the direction of gravity relative to the ground based on the height relative to the ground.

Some exemplary embodiments of the present disclosure provide a load stabilization device. Based on the foregoing description, the motion sensor 13 may include a second motion sensor and a third motion sensor that is disposed on the base. The second motion sensor may be configured to measure a rotation angle of the parallelogram mechanism 12 relative to the base 11. In some exemplary embodiments, the second motion sensor may be disposed at the first end of the parallelogram mechanism 12, so as to measure the rotation angle of the parallelogram mechanism 12 relative to the base 11.

The processor 14 may obtain second sensor data output by the second motion sensor and third sensor data output by the third motion sensor; determine the rotation angle of the parallelogram mechanism 12 relative to the base 11 based on the second sensor data; determine a velocity of the base 11 based on the third sensor data; and determine the velocity of the second end of the parallelogram mechanism 12 in the direction of gravity relative to the ground based on the rotation angle and the velocity of the base 11.

Specifically, the processor 14 may determine a velocity of the second end of the parallelogram mechanism 12 relative to the base based on the rotation angle; and determines the velocity of the second end of the parallelogram mechanism 12 in the direction of gravity relative to the ground based on the velocity of the second end of the parallelogram mechanism 12 relative to the base and the velocity of the base.

In some exemplary embodiments, the second motion sensor may be any sensor that is capable of measuring an angle, for example, a magnetic encoder, a potentiometer, or a Hall sensor. In some exemplary embodiments, as shown in FIG. 3, the second motion sensor may be disposed at the hinge point S3 at which the first cross rod portion 1201 in the four-bar linkage 120 of the parallelogram mechanism 12 is hingedly connected to the fixed portion 112, or the hinge point S4 at which the second cross rod portion 1202 is hingedly connected to the fixed portion 112, so as to measure the angle between the parallelogram mechanism 12 and the fixed portion 112 of the base.

In some exemplary embodiments, the processor 14 may be disposed at the second end of the parallelogram mechanism 12, so as to electrically connect the processor 14 to the motion sensor 13 that is also disposed at the second end of the parallelogram mechanism 12. In addition, the processor 14 may alternatively be disposed on the base 11, or may be disposed on the load stabilization device 10 or other parts of the load stabilization system. This is not specifically limited in the present disclosure.

In some exemplary embodiments, the third motion sensor may be any velocity sensor that is capable of measuring a velocity, and may be configured to measure the velocity of the base. Specifically, the third motion sensor may be configured to measure a velocity of the base relative to the ground.

In some exemplary embodiments, the third motion sensor may include a vision sensor, for example, a visual odometer. A sensing direction of the vision sensor may face the ground. In addition, the vision sensor may be disposed at any position on the base that is not blocked by other components. The position of the visual odometer is not specifically limited in the present disclosure.

A process in which the processor determines the rotation angle of the parallelogram mechanism 12 relative to the base 11 based on the second sensor data output by the second motion sensor; determines the velocity of the base 11 based on the third sensor data output by the third motion sensor; and determines the velocity of the second end of the parallelogram mechanism 12 in the direction of gravity relative to the ground based on the rotation angle and the velocity of the base 11 will be described below using a combination 132 of the second motion sensor being an encoder and the third motion sensor being a visual odometer as an example.

In some exemplary embodiments, the X-axis direction, the Y-axis direction, and the Z-axis direction are used to represent three two-by-two orthogonal directions, and the Z-axis direction is the direction of gravity.

The visual odometer may measure the velocity (denoted as $v_p$) of the base 11 of the load stabilization device 10 relative to the inertial space, which may be expressed as:

$$v_p = \begin{bmatrix} v_{px} \\ v_{py} \\ v_{pz} \end{bmatrix},$$

where $v_{px}$ is a component of the velocity of the base 11 relative to the inertial space on the X-axis; $v_{py}$ is a component of the velocity of the base 11 relative to the inertial space on the Y-axis; and $v_{pz}$ is a component of the velocity of the base 11 relative to the inertial space on the Z-axis.

The magnetic encoder may obtain the angle between the parallelogram mechanism 12 and the base 11 through measurement, and the angle is denoted as θ.

The processor 14 may receive the velocity $v_p$ of the base 11 relative to the inertial space that is measured and sent by the visual odometer, and the rotation angle θ of the parallelogram mechanism 12 relative to the base 11 that is measured and sent by an angle sensor.

The processor 14 may obtain the velocity (denoted as $v_{g2}$) of the second end of the parallelogram mechanism 12 relative to the ground through calculation based on the velocity $v_p$ of the base 11 relative to the inertial space and the rotation angle θ of the parallelogram mechanism 12 relative to the base 11:

$$v_{g2} = \begin{bmatrix} v_{g2x} \\ v_{g2y} \\ v_{g2z} \end{bmatrix} = \begin{bmatrix} v_{px} + \dot{\theta} l \sin \theta \\ v_{py} \\ v_{pz} + \dot{\theta} l \cos \theta \end{bmatrix},$$

where the velocity of the second end of the parallelogram mechanism 12 relative to the ground is a velocity relative to the inertial coordinate system; l represents a length of the parallelogram mechanism 12; $\dot{\theta}$ represents a differential operation on θ; $v_{g2x}$ represents a component of the velocity of the second end of the parallelogram mechanism 12 relative to the ground on the X-axis; $v_{g2y}$ represents a component of the velocity of the second end of the parallelogram mechanism 12 relative to the ground on the Y-axis; and $v_{g2z}$ represents a component of the velocity of the second end of the parallelogram mechanism 12 relative to the ground on the Z-axis, and $v_{g2z} = v_{pz} + \dot{\theta} l \cos \theta$. In other words, it can be obtained that the velocity of the second end of the parallelogram mechanism 12 in the direction of gravity relative to the ground is $v_{g2z} = v_{pz} + \dot{\theta} l \cos \theta$.

Some exemplary embodiments of the present disclosure provide a load stabilization device. Based on the foregoing embodiment, the motion sensor 13 may include a first motion sensor disposed at the second end of the parallelogram mechanism 12, a second motion sensor configured to measure a rotation angle of the parallelogram mechanism 12 relative to the base 11, and a third motion sensor disposed on the base 11.

In some exemplary embodiments, the processor 14 may calculate a first velocity and a second velocity of the second end of the parallelogram mechanism 12 in the direction of gravity relative to the ground by using two different motion sensor combinations, and fuse (e.g., combine or add) the first velocity and the second velocity to determine the velocity of the second end of the parallelogram mechanism 12 in the direction of gravity relative to the ground.

A first motion sensor combination is a first motion sensor disposed at the second end of the parallelogram mechanism 12.

In this combination, the processor 14 may obtain first sensor data output by the first motion sensor, and determine a first velocity of the second end in the direction of gravity relative to the ground based on the first sensor data.

The first motion sensor may be an inertial measurement unit, configured to measure linear acceleration and an angular velocity of the second end of the parallelogram mechanism 12. The processor 14 may obtain the first velocity of the second end of the parallelogram mechanism 12 in the direction of gravity relative to the ground through calculation based on the linear acceleration and the angular velocity of the second end of the parallelogram mechanism 12. This process has been described in detail above, and thus will not be repeated herein.

A second motion sensor combination is a second motion sensor configured to measure a rotation angle of the parallelogram mechanism 12 relative to the base 11, and a third motion sensor disposed on the base 11.

In this combination, the processor 14 may obtain second sensor data output by the second motion sensor and third sensor data output by the third motion sensor; determine the rotation angle of the parallelogram mechanism 12 relative to the base 11 according to the second sensor data; determine a velocity of the base based on the third sensor data; and determine a second velocity of the second end of the parallelogram mechanism 12 in the direction of gravity relative to the ground based on the rotation angle and the velocity of the base.

The second motion sensor may be an encoder, for example, a magnetic encoder. The third motion sensor may be a velocity sensor, configured to measure the velocity of the base. In some exemplary embodiments, the third motion sensor may include a vision sensor, for example, a visual odometer.

In the above description, the process in which the processor determines the rotation angle of the parallelogram mechanism 12 relative to the base 11 according to the second sensor data output by the second motion sensor; determines the velocity of the base 11 according to the third sensor data output by the third motion sensor; and determines the velocity of the second end of the parallelogram mechanism 12 in the direction of gravity relative to the ground according to the rotation angle and the velocity of the base 11 has been described in detail by using an example in which the second motion sensor is a magnetic encoder and the third motion sensor is a visual odometer. The details will not be described herein.

Figure 5:
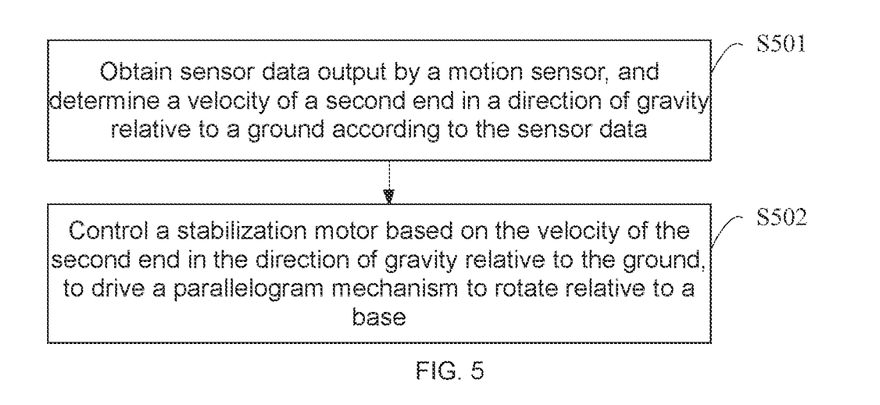
FIG. 5 is a flowchart of a control method of a load stabilization device according to some exemplary embodiments of the present disclosure.

Some exemplary embodiments of the present disclosure provide a control method of the load stabilization device. FIG. 5 is a flowchart of a control method of a load stabilization device according to some exemplary embodiments of the present disclosure. The load stabilization device may include a base and a parallelogram mechanism. A first end of the parallelogram mechanism may be rotatably connected to the base. A second end of the parallelogram mechanism away from the first end may be used to carry a load. A specific structure of the load stabilization device is shown in FIG. 1, FIG. 2, FIG. 3, and FIG. 4. Details will not be described herein. A control method of a vertical stabilization device may be specifically performed by the load stabilization device, and specifically, by the processor of the load stabilization device. As shown in FIG. 5, this method may include the following steps:

Step S501: Obtain sensor data output by the motion sensor, and determine a velocity of the second end in a direction of gravity relative to a ground based on the sensor data.

In some exemplary embodiments, the motion sensor may include a first motion sensor disposed at the second end. The processor may obtain first sensor data output by the first motion sensor, and determine the velocity of the second end relative to the ground based on the first sensor data.

In some exemplary embodiments, a first motion sensor may include one or more of an inertial measurement unit, a vision sensor, an ultrasonic sensor, and a barometer.

Exemplarily, the first motion sensor may include the inertial measurement unit. The processor may determine the velocity of the second end in the direction of gravity relative to the ground according to the first sensor data output by the inertial measurement unit.

In some exemplary embodiments, the motion sensor may include a second motion sensor and a third motion sensor disposed on the base. The second motion sensor may be configured to measure a rotation angle of the parallelogram mechanism relative to the base.

The processor may obtain second sensor data output by the second motion sensor and third sensor data output by the third motion sensor; determine a rotation angle of the parallelogram mechanism relative to the base based on the second sensor data; determines a velocity of the base based on the third sensor data; and determines the velocity of the second end in the direction of gravity relative to the ground based on the rotation angle and the velocity of the base.

Specifically, the processor may determine a velocity of the second end relative to the base according to the rotation angle; and determine the velocity of the second end in the direction of gravity relative to the ground based on the velocity of the second end relative to the base and the velocity of the base.

In some exemplary embodiments, the third motion sensor may include a vision sensor, for example, a visual odometer. The second motion sensor may include an encoder, for example, a magnetic encoder.

In some exemplary embodiments, the motion sensor may include a first motion sensor disposed at the second end, a second motion sensor configured to measure a rotation angle of the parallelogram mechanism relative to the base, and a third motion sensor disposed on the base.

The processor may obtain first sensor data, second sensor data, and third sensor data output by the first motion sensor, the second motion sensor, and the third motion sensor, respectively; determine a first velocity of the second end in the direction of gravity relative to the ground based on the first sensor data; determine a rotation angle of the parallelogram mechanism relative to the base based on the second sensor data; determine a velocity of the base based on the third sensor data; determine a second velocity of the second end in the direction of gravity relative to the ground based on the rotation angle and the velocity of the base; and fuse (e.g., combine or add) the first velocity and the second velocity to determine the velocity of the second end in the direction of gravity relative to the ground.

In these exemplary embodiments, the implementation and mechanism of the processor obtaining the sensor data output by the motion sensor and determining the velocity of the second end in the direction of gravity relative to the ground based on the sensor data are the same as those in the foregoing description. Details will not be described herein.

Step S502: Control the stabilization motor based on the velocity of the second end in the direction of gravity relative to the ground to drive the parallelogram mechanism to rotate relative to the base.

After obtaining the velocity of the second end of the parallelogram mechanism in the direction of gravity relative to the ground through calculation, the processor may generate the control instruction for the stabilization motor based on the velocity of the second end of the parallelogram mechanism in the direction of gravity relative to the ground and a target velocity of the second end of the parallelogram mechanism in the direction of gravity relative to the ground, so as to control the stabilization motor to drive, based on the control instruction, the parallelogram mechanism to rotate relative to the base to stabilize the load carried at the second end.

The target velocity of the second end in the direction of gravity relative to the ground is 0.

In some exemplary embodiments, the implementation and mechanism of the processor controlling the stabilization motor based on the velocity of the second end in the direction of gravity relative to the ground, so as to drive the parallelogram mechanism to rotate relative to the base are the same as those in the foregoing description. Details will not be described herein.

Exemplarily, the stabilization motor may include a first stabilization motor and a second stabilization motor. The first stabilization motor and second stabilization motor may be configured to jointly drive, based on the control instruction, the parallelogram mechanism to rotate relative to the base.

In some exemplary embodiments, the first stabilization motor may include a motor drive logic circuit. The first stabilization motor may be electrically connected to the processor to receive the control instruction from the processor, and control an input current of the second stabilization motor based on the control instruction to drive the second stabilization motor to generate torque.

In some exemplary embodiments, the load stabilization device may further include a first transmission component and a second transmission component. The first transmission component may be rotatably connected to the second stabilization motor and the parallelogram mechanism. The second transmission component may be rotatably connected to the second stabilization motor and the parallelogram mechanism. The first stabilization motor and the second stabilization motor may jointly drive, through the first transmission component and the second transmission component, the parallelogram mechanism to rotate relative to the base.

In some exemplary embodiments, in the load stabilization device, the load carried at the second end of the parallelogram mechanism may be a photographing device. The photographing device may be configured to capture an image/a video, may be a camera or a video camera, or may be a mobile phone or a tablet computer having a photographing function. Alternatively, the load may be a load device other than the photographing device. This is not limited herein.

In some exemplary embodiments, the load stabilization device may further include a three-axis gimbal. The second end of the parallelogram mechanism carries the load via the three-axis gimbal. The processor may be configured to control the three-axis gimbal to stabilize the load in one or more of a yaw direction, a roll direction, and a pitch direction.

For the exemplary embodiments described above, it should be understood that the disclosed device and method may be implemented in other manners. For example, the described device embodiment is merely an example. For example, the unit division is merely logical function division and may be other division in actual implementation. For example, a plurality of units or components may be combined or integrated into a system, or some features may be omitted or may not be performed. In addition, the displayed or discussed couplings or direct couplings or communication connections may be implemented through some interfaces, indirect couplings or communications between the devices or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve certain purposes.

In addition, functional units in some exemplary embodiments of the present disclosure may be integrated into one processing unit, or each of the units may exist alone physically, or two or more units may be integrated into one unit. The integrated unit may be implemented in a form of hardware, or may be implemented in a form of hardware plus a software functional unit(s).

The integrated unit implemented in the form of a software functional unit may be stored in a computer readable storage medium. The software functional unit may be stored in a storage medium and include instructions to cause a computer device (which may be a personal computer, a server, a network device, or the like) or a processor(s) to perform some of the steps of the methods described in the present disclosure. The foregoing storage medium includes any medium that can store program code, such as a USB flash drive, a removable hard disk, a read-only memory (ROM), a random access memory (RAM), a magnetic disk, or an optical disc.

Those skilled in the art can clearly understand that, for convenience and conciseness of description, only the division of the foregoing function modules is used as an example in the description. In practical applications, the foregoing functions may be allocated to and completed by different function modules as required, that is, an internal structure of the device may be divided into different function modules to complete all or some of the functions described above. For a specific working process of the device described above, reference may be made to the corresponding process in the foregoing description. Details will not be described herein again.

Finally, it should be noted that the foregoing exemplary embodiments are intended to illustrate and not to limit the technical solutions of the present disclosure. Although the present disclosure has been described in detail with reference to the exemplary embodiments, those of ordinary skill in the art should understand that the technical solutions described herein can be modified or equivalently replaced. These modifications or replacements do not make the essence of the corresponding technical solutions deviate from the scope of the technical solutions of the present disclosure.

What is claimed is:

1. A load stabilization device, comprising:
a base;
a parallelogram mechanism, including:
a first end through which the parallelogram is rotatably connected to the base, and
a second end away from the first end to carry a load;
a motion sensor;
a stabilization motor, configured to drive the parallelogram mechanism to rotate relative to the base; and
at least one processor, configured to:
obtain sensor data output by the motion sensor,
determine a velocity of the second end in a direction of gravity relative to a ground based on the sensor data, and
generate a control instruction, based on the velocity of the second end in the direction of gravity relative to the ground, to direct the stabilization motor to drive the parallelogram mechanism to rotate relative to the base to stabilize the load carried at the second end.

2. The device according to claim 1, wherein
the motion sensor includes a first motion sensor disposed at the second end; and
to obtain the sensor data output by the motion sensor and the determine the velocity of the second end in the direction of gravity relative to the ground based on the sensor data, the at least one processor being further configured to:
obtain first sensor data output by the first motion sensor, and
determine the velocity of the second end relative to the ground based on the first sensor data.

3. The device according to claim 2, wherein
the first motion sensor includes at least one of an inertial measurement unit, a vision sensor, an ultrasonic sensor, or a barometer.

4. The device according to claim 3, wherein
the first motion sensor includes the inertial measurement unit; and
to obtain the first sensor data output by the first motion sensor and determine the velocity of the second end relative to the ground based on the first sensor data, the at least one processor being further configured to:
determine the velocity of the second end in the direction of gravity relative to the ground based on the first sensor data output by the inertial measurement unit.

5. The device according to claim 1, wherein
the motion sensor includes a second motion sensor to measure a rotation angle of the parallelogram mechanism relative to the base and a third motion sensor disposed on the base; and
to obtain sensor data output by the motion sensor and determine a velocity of the second end in a direction of gravity relative to a ground based on the sensor data, the at least one processor being further configured to:
obtain second sensor data output by the second motion sensor and third sensor data output by the third motion sensor,
determine a rotation angle of the parallelogram mechanism relative to the base based on the second sensor data,
determine a velocity of the base based on the third sensor data, and
determine the velocity of the second end in the direction of gravity relative to the ground based on the rotation angle and the velocity of the base.

6. The device according to claim 5, wherein
to determine the velocity of the second end in the direction of gravity relative to the ground based on the rotation angle and the velocity of the base, the at least one processor being further configured to:
determine a velocity of the second end relative to the base based on the rotation angle; and
determine the velocity of the second end in the direction of gravity relative to the ground based on the velocity of the second end relative to the base and the velocity of the base.

7. The device according to claim 5, wherein
the third motion sensor includes a vision sensor.

8. The device according to claim 5, wherein
the second motion sensor includes an encoder.

9. The device according to claim 1, wherein
the motion sensor includes:
a first motion sensor disposed at the second end,
a second motion sensor configured to measure a rotation angle of the parallelogram mechanism relative to the base, and
a third motion sensor disposed on the base; and
to obtain the sensor data output by the motion sensor and determine the velocity of the second end in the direction of gravity relative to the ground based on the sensor data, the at least one processor being further configured to:
obtain first sensor data output by the first motion sensor, second sensor data output by the second motion sensor, and third sensor data output by the third motion sensor,
determine a first velocity of the second end in the direction of gravity relative to the ground based on the first sensor data,
determine a rotation angle of the parallelogram mechanism relative to the base based on the second sensor data,
determine a velocity of the base based on the third sensor data,
determine a second velocity of the second end in the direction of gravity relative to the ground based on the rotation angle and the velocity of the base, and
fuse the first velocity and the second velocity to determine the velocity of the second end in the direction of gravity relative to the ground.

10. The device according to claim 1, wherein
to generate the control instruction for the stabilization motor based on the velocity of the second end in the direction of gravity relative to the ground, the at least one processor being further configured to:
generate the control instruction for the stabilization motor based on the velocity of the second end in the direction of gravity relative to the ground and a target velocity of the second end in the direction of gravity relative to the ground, wherein
the target velocity of the second end in the direction of gravity relative to the ground is 0.

11. The device according to claim 1, wherein
the stabilization motor includes a first stabilization motor and a second stabilization motor; and the first stabilization motor and the second stabilization motor are configured to jointly drive, according to the control instruction, the parallelogram mechanism to rotate relative to the base.

12. The device according to claims to 11, further comprising:
a first transmission component rotatably connected to the second stabilization motor and the parallelogram mechanism; and
a second transmission component rotatably connected to the second stabilization motor and the parallelogram mechanism, wherein
the first stabilization motor and the second stabilization motor jointly drive, by using the first transmission component and the second transmission component, the parallelogram mechanism to rotate relative to the base.

13. The device according to claim 1, wherein
the load is a photographing device.

14. The device according to claim 1, further comprising:
a three-axis gimbal, wherein
the second end carries the load via the three-axis gimbal, and
the at least one processor being further configured to control the three-axis gimbal to stabilize the load in at least one of a yaw direction, a roll direction, or a pitch direction.

15. A method for controlling a load stabilization device, wherein the load stabilization device includes at least one processor,
a base,
a parallelogram mechanism, including a first end through which the parallelogram is rotatably connected to the base, and a second end away from the first end to carry a load,
a motion sensor, and
a stabilization motor, configured to drive the parallelogram mechanism to rotate relative to the base,
the method comprising:
obtaining, by the at least one processor, sensor data output by the motion sensor;
determining, by the at least one processor, a velocity of the second end in a direction of gravity relative to a ground based on the sensor data; and
generating, by the at least one processor and based on the velocity of the second end in the direction of gravity relative to the ground, a control instruction for the stabilization motor drive the parallelogram mechanism to rotate relative to the base to stabilize the load carried at the second end.

16. The method according to claim 15, wherein the motion sensor includes a first motion sensor disposed at the second end; and
the obtaining of the sensor data output by the motion sensor and the determining of the velocity of the second end in the direction of gravity relative to the ground based on the sensor data includes:
obtaining first sensor data output by the first motion sensor, and
determining the velocity of the second end relative to the ground based on the first sensor data.

17. The method according to claim 16, wherein the first motion sensor includes the inertial measurement unit; and
the obtaining of the first sensor data output by the first motion sensor and determining of the velocity of the second end relative to the ground based on the first sensor data includes:
determining the velocity of the second end in the direction of gravity relative to the ground based on the first sensor data output by the inertial measurement unit.

18. The method according to claim 15, wherein
the motion sensor includes a second motion sensor to measure a rotation angle of the parallelogram mechanism relative to the base and a third motion sensor disposed on the base; and
the obtaining of the sensor data output by the motion sensor and the determining of the velocity of the second end in the direction of gravity relative to the ground based on the sensor data includes:
obtaining second sensor data output by the second motion sensor and third sensor data output by the third motion sensor,
determining a rotation angle of the parallelogram mechanism relative to the base based on the second sensor data,
determining a velocity of the base based on the third sensor data, and
determining the velocity of the second end in the direction of gravity relative to the ground based on the rotation angle and the velocity of the base.

19. The method according to claim 18, wherein
the determining of the velocity of the second end in the direction of gravity relative to the ground based on the rotation angle and the velocity of the base includes:
determining a velocity of the second end relative to the base based on the rotation angle; and
determining the velocity of the second end in the direction of gravity relative to the ground based on the velocity of the second end relative to the base and the velocity of the base.

20. The method according to claim 15, wherein
the motion sensor includes:
a first motion sensor disposed at the second end,
a second motion sensor configured to measure a rotation angle of the parallelogram mechanism relative to the base, and
a third motion sensor disposed on the base; and
the obtaining of the sensor data output by the motion sensor and the determining of the velocity of the second end in the direction of gravity relative to the ground based on the sensor data includes:
obtaining first sensor data output by the first motion sensor, second sensor data output by the second motion sensor, and third sensor data output by the third motion sensor,
determining a first velocity of the second end in the direction of gravity relative to the ground based on the first sensor data,
determining a rotation angle of the parallelogram mechanism relative to the base based on the second sensor data,
determining a velocity of the base based on the third sensor data,
determining a second velocity of the second end in the direction of gravity relative to the ground based on the rotation angle and the velocity of the base, and
fusing the first velocity and the second velocity to determine the velocity of the second end in the direction of gravity relative to the ground.

* * * * *